United States Patent [19]
Iwata

[11] Patent Number: 5,620,570
[45] Date of Patent: Apr. 15, 1997

[54] METHOD OF MANUFACTURING HYDROUS OIL

[75] Inventor: Yoshihiro Iwata, 809-2, Higashiirushuzei-cho Sagaru Nijyo Senbondori, Kamigyo-ku, Kyoto-shi, 602, Japan

[73] Assignee: Yoshihiro Iwata, Kyoto, Japan

[21] Appl. No.: 334,531

[22] Filed: Nov. 4, 1994

[30] Foreign Application Priority Data

Sep. 9, 1994 [JP] Japan ..................................... 6-240775

[51] Int. Cl.$^6$ .................................................. C07C 5/00
[52] U.S. Cl. .............................. 204/157.15; 204/157.5; 204/157.52; 252/307
[58] Field of Search ........................... 204/157.15, 157.5, 204/157.52, 188; 252/307, 309

[56] References Cited

U.S. PATENT DOCUMENTS

| | | | |
|---|---|---|---|
| 4,333,422 | 6/1982 | Mahoney | 123/3 |
| 4,597,671 | 7/1986 | Marelli | 366/127 |
| 4,716,024 | 12/1987 | Pera | 422/186.01 |
| 4,732,576 | 3/1988 | Friedrich et al. | 44/51 |
| 5,249,957 | 10/1993 | Hirata | 431/354 |
| 5,320,726 | 6/1994 | Iwata | 204/157.15 |
| 5,377,648 | 1/1995 | Iwata | 123/538 |

FOREIGN PATENT DOCUMENTS 6-213079    8/1994    Japan .

Primary Examiner—Donald R. Valentine
Assistant Examiner—William T. Leader
Attorney, Agent, or Firm—Flynn, Thiel, Boutell & Tanis, P.C.

[57] ABSTRACT

A method of and apparatus for manufacturing hydrous oil are provided. A plurality of frequency and low voltage and current. A plurality of low frequency and low voltage and current signals are applied to a water supply pipe system and a low frequency and low voltage current signal is applied to an oil supply system. The water and oil mix with each other at a mixing point and a plurality of low frequency and low voltage current signals are applied to a mixing supply system formed by joining the water supply pipe system and oil pipe system. The mixture of water and oil is subjected to emulsification in a heater-equipped emulsion tank and the emulsification is facilitated with the aid of air so as to produce the hydrous oil. After a low frequency and low voltage and current signal is applied to the hydrous oil, air is supplied to the hydrous oil in an aeration tank. Further, after a low frequency and low voltage and current signal is applied to the hydrous oil, the hydrous oil is flowed into a storage tank.

3 Claims, 2 Drawing Sheets

METHOD OF MANUFACTURING HYDROUS OIL

BACKGROUND OF THE INVENTION

1. Field of the Invention

The present invention relates to a method of and apparatus for manufacturing hydrous oil by adding water to gasoline, light oil, heavy oil or the like for use in an engine of an automobile or a boiler.

2. Prior Art

The present inventor invented an invention entitled "DEVICE FOR PURIFYING FUEL" which is disclosed in Japanese Laid-Open Publication No. 6-213079 wherein oil and water is supplied from a separate oil tank and a water tank by way of a supply pipe and the water and oil are mixed and emulsified so as to produce a hydrous oil and the hydrous oil is used by an engine for combustion.

In the prior art, there is disclosed a fundamental technique that a low frequency and low voltage and current signal is applied to water, oil and the mixture of the water and oil, thereby improving the quality of the hydrous oil. However, this technique does not study and describe in detail the low frequency and low voltage and current signal application means, an emulsification means, or an aeration tank. As a result, there is a likelihood that the best hydrous oil is not produced.

SUMMARY OF THE INVENTION

The present invention has been made in view of the problem of the prior art as mentioned above and has an object to provide a method of and apparatus for manufacturing hydrous oil wherein the low frequency and low voltage and current signal application means comprise a plurality of units and an emulsion tank and an aeration tank are provided to produce a desired hydrous oil with assurance.

To achieve the above object, a method of manufacturing hydrous oil according to the present invention is characterized in comprising the steps of applying low frequency and low voltage and current signals to the water supply pipe for a plurality of times, thereby gradually weakening affinity between water molecules and increasing the dissolved oxygen in the water, applying low frequency and low voltage and current signals to the oil supply pipe for a plurality of times, thereby weakening the affinity between oil molecules and increasing the dissolved oxygen in the oil, mixing the water and oil which are respectively weakened in their molecules and increased in their dissolved oxygen in a mixing pipe, applying low frequency and low voltage and current signals to the mixing pipe for plurality of times, thereby mixing the water and oil more intimately and increasing the dissolved oxygen in the mixture, subjecting the mixture of the water and oil to emulsification in a heater-equipped emulsion tank 7 and facilitating the emulsification with the aid of air so as to produce hydrous oil, applying a low frequency and low voltage and current signal to the mixing pipe so as to increase the dissolved oxygen in the hydrous oil and then supplying sufficient air to the hydrous oil in an aeration tank, applying a low frequency and low voltage and current signal to the mixing pipe so as to disperse the air uniformly in the hydrous oil and permit the hydrous oil to be free from impurities, and storing the hydrous oil in the storage tank.

The method is further characterized in that ratio of amount of the oil to be supplied from the oil tank to the amount of water to be supplied from the water tank ranges from 5:5 to 8:2.

The method is further characterized in that the low frequency and low voltage and current signal has a frequency ranging from 40 to 320 Hz, a voltage ranging from 0.5 to 2V and a current ranging from 1 to 3 mA.

The low frequency and low voltage and current signal is characterized in that it has a frequency which is set in the manner that the frequency to be applied to the oil supply pipe is higher than that to be applied to the water supply pipe, the frequency to be applied to a mixing supply pipe after the water and oil mix is set to be substantially the same as that to be applied to the oil supply pipe, and the frequency is increased in the direction of the flow of the hydrous oil, and that to be applied to the mixing supply pipe after the hydrous oil flows from the emulsion tank is substantially the same as that to be applied to the oil pipe, the voltage is set to be the same until the hydrous oil flows to the aeration tank and it is increased after the hydrous oil flows from the aeration tank while the current to be applied to the water supply pipe immediately before the water and oil mix is higher than that to be applied to the oil supply pipe and that to be applied to the mixing supply pipe immediately after the water and oil mix is set to be the middle between that to be applied to the water supply pipe and the oil supply pipe and it is increased in the order of the flow of the hydrous oil, and that to be applied to the mixing supply pipe after the hydrous oil flows from the emulsion tank is substantially the same as that to be applied to the mixing supply pipe immediately after the water and oil join.

The method is further characterized in that the frequency and the current to be applied to a pipe through which various heavy oils flow are set to be larger than those to be applied to a pipe through which light oil flows while the voltage to be applied to the pipe through which various heavy oils flow is set to be substantially the same as that to be applied to the pipe through which light oil flows.

Still further, to achieve the above object, an apparatus for manufacturing hydrous oil according to the present invention comprises a water supply pipe system comprising a water supply pipe, on which a flow control valve, a plurality of low frequency and low voltage and current signal application units, and a check valve are provided, an oil supply pipe system comprising the oil supply pipe, on which a flow control valve, a low frequency and low voltage and current signal application unit, and a check valve are provided, a mixing supply pipe system comprising a mixing supply pipe formed by joining said water supply pipe system and oil supply pipe system, on which a plurality of low frequency and low voltage and current signal application units, and a check valve are provided, a heater-equipped emulsion tank connected to said mixing supply pipe system and provided downstream relative to said mixing supply pipe system, an aeration tank connected to said heater-equipped emulsion tank through a low frequency and low voltage and current signal application unit, and a plurality of low frequency and low voltage and current signal application units respectively provided between said aeration tank and the reservoir tank.

With the arrangement of the present invention, when a plurality of electrostatic induction fields caused by low frequency and low voltage and current signals act upon the water supply system, the affinity between water molecules is weakened by oscillation, and oxygen the air in the water is mixed with and dissolved in the water molecules so as to increase the dissolved oxygen. Likewise, an electrostatic induction field caused a low frequency and low voltage and current signal acts upon the oil supply the affinity between the oil molecules is weakened and the dissolved oxygen in oil is increased. Further, after they join each other, a plurality of electrostatic induction fields caused by the low frequency and low voltage and current signals act upon the mixing supply pipe so that the water molecules and the oil molecules are varied so that the water and oil can be more intimately mixed with each other and the dissolved oxygen is increased and oxygen from air in the mixture of water and oil is mixed with and dissolved in the mixture so as to increase the dissolved oxygen. The water and oil are subjected to emulsification in the heater-equipped emulsion tank under a high temperature with the aid of air to thereby produce the hydrous oil. The electrostatic induction field caused by the low frequency and low voltage and current signal acts upon the hydrous oil after the emulsification, thereby increasing the dissolved oxygen in the hydrous oil. The hydrous oil is subjected to aeration in the aeration tank where sufficient oxygen is added by the supply of air and, thereafter, the electrostatic induction field caused by the low frequency and low voltage and current signal acts upon the hydrous oil so as to penetrate the air uniformly in the hydrous oil and permit the hydrous oil to be free from impurities and thereafter the hydrous oil is stored in the reserving tank. The resultant hydrous oil can be used for combustion in an engine or a combustion portion of a boiler, thereby remarkably reducing the consumption of fuel and NOx and CO contained in the exhausted fuel.

PREFERRED EMBODIMENT OF THE INVENTION

Figure 1:
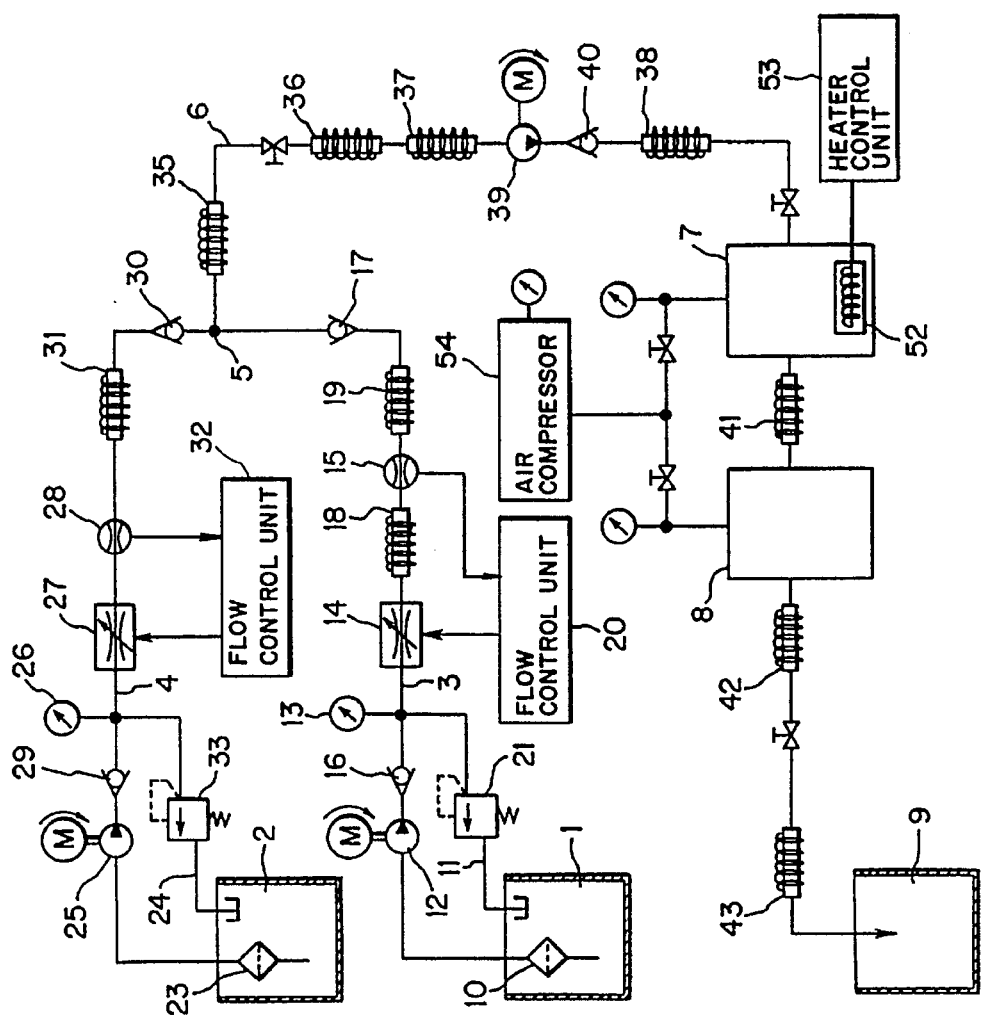
FIG. 1 is a schematic view explaining an apparatus for carrying out a method of manufacturing hydrous oil according to the present invention.

An embodiment of the present invention will be described with reference to FIGS. 1 and 2.

In the same figures, denoted at 1 is a water tank, 2 is an oil tank which is filled with heavy oil according to the present invention, although the oil tank 2 can be filled with gasoline, light oil, heavy oil, etc.

Water is supplied from the water tank I through a water supply pipe 3 and oil is supplied from the oil tank 2 through an oil supply pipe 4 and the thus supplied water and oil mix with each other at a mixing point 5 and then they are supplied to a heater-equipped emulsion tank 7 through a mixing supply pipe 6. The water and oil are emulsified with each other in the heater-equipped emulsion tank 7 and supplied to an aeration tank 8 where sufficient oxygen is mixed with the water and oil and they are stored in a reservoir tank 9.

A filter 10 and a return pipe 11 are disposed in the water tank 1 and the water in the water tank 1 is supplied by a pump 12 through the filter 10 to the water supply pipe 3. Provided on the water supply pipe 3 are a pressure meter 13, a flow control valve 14, a flow meter 15, check valves 16 and 17, and low frequency and low voltage and current signal application units 18 and 19. The low frequency and low voltage and current signal application units 18 and 19 comprise, for example conductive wires which are wound around the outer periphery of the water supply pipe 3 like coils.

The amount of water which flows in the water supply pipe 3 is measured by the flow meter 15 and is controlled to a desired value by the flow control valve 14 which is controlled by a flow control unit 20. Overflow water is returned to the water tank 1 by the return pipe 11 by way of a relief valve 21.

A filter 23 and a return pipe 24 are provided on the oil tank 2. Oil in the oil tank 2 is supplied by a pump 25 to the oil supply pipe 4 by way of the filter 23. Provided on the oil supply pipe 4 are a pressure meter 26, a flow control valve 27, a flow meter 28, check valves 29 and 30 and a low frequency and low voltage and current signal application unit 31. The low frequency and low voltage and current signal application unit 31 comprises, for example, a conductive wire which is wound around the outer periphery of the oil supply pipe 4 like a coil.

The amount of oil which flows in the oil supply pipe 4 is measured by the flow meter 28 and is controlled to a desired value by the flow valve 27 which is controlled by a flow control unit 32. Overflow oil is returned to the oil tank 2 by the return pipe 24 by way of a relief valve 33.

Water and oil which mix with each other at the mixed point 5 after respectively passing through the check valves 17 and 30 flow through the mixing supply pipe 6 to the heater-equipped emulsion tank 7, passing through the low frequency and low voltage and current signal application units 35, 36, 37 and 38 and also through a pump 39 and a check valve 40. Hydrous oil emulsified in the emulsion tank 7 flows to the aeration tank 8 through a low frequency and low voltage and current application unit 41 and further through low frequency and low voltage and current application units 42 and 43 to the storage tank 9 to storage therein.

Figure 2:
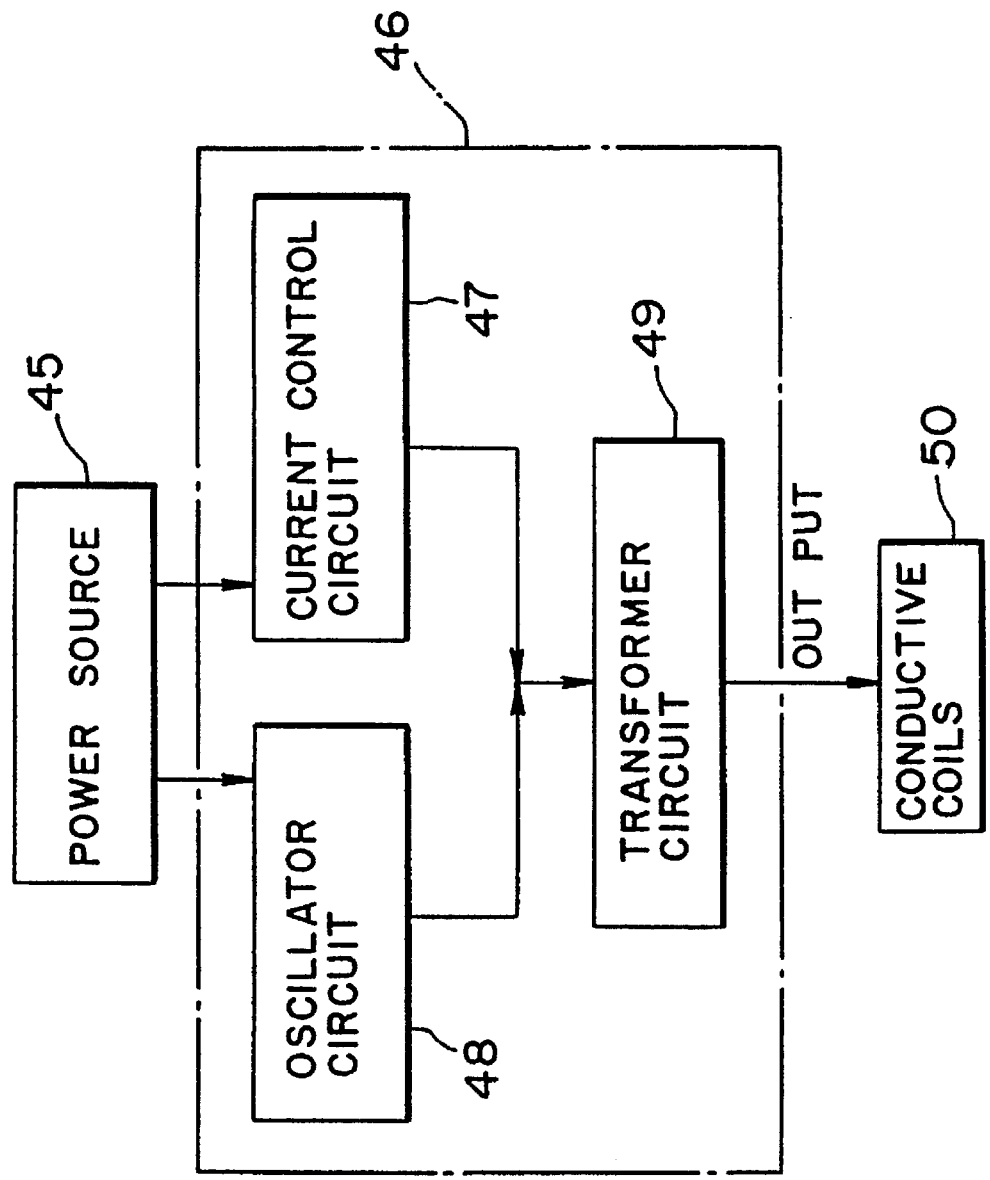
FIG. 2 is a schematic view explaining an ac signal generator employed by the present invention.

FIG. 2 is a schematic view for explaining an ac signal generator 46, which selectively controls current from a commercial power source or a battery 45 according to the kind of oil within a range of 1 to 3 mA in a current control circuit 47 thereof and can also generate a low frequency signal ranging from 40 to 320 Hz in a oscillator circuit 48 thereof. A voltage transformer circuit 49 can selectively supply voltage to respective coils 50 in the low frequency and low voltage and current signal application units set forth above within a range of 0.5 to 2 V.

When the pumps 12 and 25 are driven, water and oil are supplied from the water tank 1 and the oil tank 2 to the water supply pipes 3 and 4 respectively. The flow ratio between the water and oil in the water supply pipes 3 and 4 by flow control units 20 and 32 is controlled at a given value, for example, 70% oil and 30% water, within a range of 5:5 to 8:2.

For example, a signal of low frequency, F=45 Hz, low voltage E=0.5 V, low current I=1.2 mA, is supplied from the ac signal 46 to the coil in the low frequency and low voltage and current signal application units 18 provided at the water supply pipe 3 and a signal of low frequency, F=90 Hz, low voltage E=0.5 V, low current I=1.8 mA, is supplied therefrom to the coil in the low frequency and low voltage and current signal application unit 19, to thereby gradually weaken affinity between water molecules and oxygen spreads into the water to be dissolved therein from air in contact therewith, so that the dissolved oxygen in water is increased.

On the other hand, for example, a signal of low frequency, F=106 Hz, low voltage E=0.5 V, low current I=1.4 mA, is supplied to a coil in the low frequency and low voltage and current signal application unit 31 provided at the oil supply pipe 4, to thereby reduce the molecules of oil in size as well as that of water and increase the dissolved oxygen therein.

The water and oil reduced in affinity and increased in dissolved oxygen mix with each other at the mixing point 5 and are further promoted in mixing and increased in dissolved oxygen by supplying, for example, a signal of low frequency, F=106 Hz, low voltage E=0.5 V, low current I=1.6 mA to a coil in the low frequency and low voltage and current signal application unit 35, a signal of low frequency, F=106 Hz, low voltage E=0.5 V, low current I=1.8 mA to a coil in the low frequency and low voltage and current signal application unit 36, a signal of low frequency, F=220 Hz, low voltage E=0.5 V, low current I=1.8 mA to a coil in the low frequency and low voltage and current signal application unit 37 and a signal of low frequency, F=320 Hz, low voltage E=0.5 V, low current I=2.1 mA to a coil in the low frequency and low voltage and current signal application unit 38. The pump 39 facilitates supplying the mixture of the water and oil to the heater-equipped emulsion tank 7 located downstream.

As described above, the water and oil which have been mixed with each other to a considerable extent are supplied to the heater-equipped emulsion tank 7. The heater-equipped emulsion tank 7 is provided with a heater 52, which is controlled by a heater control unit 53 to keep the hydrous oil, for example, at a temperature of 80° C. to 120° C. Denoted at 54 is an air compressor having a capacity of generating, e.g., about 20 atm. supplies air of about 5 atm. to the heater-equipped emulsion tank 7, wherein the water and oil are stirred together to make a hydrous oil at the temperature set forth above.

Since sufficient oxygen is not mixed in the hydrous oil flowing from the emulsion tank 7, a signal of e.g. low frequency, F=160 Hz, low voltage E=0.5 V, low current I=1.8 mA is applied to the coil in the low frequency and low voltage and current signal application unit 41, to thereby increase the dissolved oxygen and the hydrous oil is supplied into the aeration tank 8. Air of 10 to 15 atm. is supplied from the air compressor 54 to the aeration tank 8, to thereby add more oxygen to the hydrous oil and homogenize the hydrous oil.

A signal of e.g. low frequency, F=70 Hz, low voltage E=1 V, low current I=1.6 mA is applied to the coil in the low frequency and low voltage and current signal application unit 42 so that the hydrous oil flowing from the aeration tank 8 is further homogenized. A signal of e.g. low frequency, F=106 Hz, low voltage E=1 V, low current I=2.2 mA is applied to the coil in the low frequency and low voltage and current signal application unit 43 so as to permit impurities to be free from the hydrous oil and the hydrous oil is stored in the storage tank 9.

Since the affinity between water molecules are gradually weakened and the dissolved oxygen is increased by the action of the plurality of electrostatic induction fields upon the water supply system, if this water joins with oil having a weakened affinity and increased dissolved oxygen, they can be mixed with each other. If they are forcibly subjected to emulsification and aeration, a desired hydrous oil can be obtained.

If the ratio of the oil to water in the hydrous oil is about 5:5, the quality of oil is slightly deteriorated but the hydrous oil can be used as fuel economically. However, if the ratio of the oil to water is 8:2, the quality of oil is remarkably improved but such hydrous oil is reduced in economical merit. Accordingly, the ratio of the water and oil, namely, ratio of emulsification must be determined, according to necessity.

The signals having various values of low frequency and low voltage and current as set forth above are based on experiments. If the signal has a low frequency ranging from 40 to 320 Hz, low voltage ranging from 0.5 to 2 V, and a low current ranging from 1 to 3 mA, the device can be applied to various oils. It is more practical to set the frequency of the signal in the manner that the frequency to be applied to the oil supply pipe 4 is higher than that to be applied to the water supply pipe 3 and that to be applied to the mixing supply pipe (low frequency and low voltage and current signal application unit 35, which is the first signal application unit after the water and oil mix,) is substantially the same as that to be applied to the oil supply pipe 4 (low frequency and low voltage and current signal application unit 31). The frequency of the signal is increased in the direction of the flow of water and oil. After the hydrous oil flows from the emulsion tank 7, the frequency of the signal is substantially the same as that in the oil tank (low frequency and low voltage and current signal application unit 31). The voltage of the signal is set to be the same until the hydrous oil flows to the aeration tank 8 and it is increased after the hydrous oil flows from the aeration tank 8. The current of the signal is set in the manner that the current to be applied to the water supply pipe 3 (low frequency and low voltage and current signal application unit 19) immediately before the water and oil mix is higher than that to be applied to the oil supply pipe 4 (low frequency and low voltage and current signal application unit 31) and that to be applied to the mixing supply pipe 6 (low frequency and low voltage and current signal application unit 35) immediately after the water and oil mix is set to be the between that to be applied to the water supply pipe 3 (low frequency and low voltage and current signal application unit 19) and the oil supply pipe 4 (low frequency and low voltage and current signal application unit 31) and it is increased in the direction of the flow of the hydrous oil. After the hydrous oil flows from the emulsion tank 7, it is practical that the current to be applied to the mixing supply pipe 6 is set to be substantially the same as that to be applied to the mixing supply pipe (low frequency and low voltage and current signal application unit 35) immediately after the water and oil mix. When using various heavy oils, the frequency and the current of the signal to be applied are higher than those to be applied to the light oil but the voltage of the signal to be applied to the heavy oil is substantially the same as those to be applied to the light oil.

In the aforementioned embodiments, the low frequency and low voltage and current signal application units are the conductive coils which are wound around the outer periphery of three supply pipes but they may be arc-shaped conductive plates provided along the outer periphery of the these supply pipes.

According to the present invention, a plurality of electrostatic induction fields caused by low frequency and low voltage and current signals act upon the water supply system and the oil supply system, the affinity between water molecules and oil molecules is weakened and the dissolved oxygen in the water and oil increase so that the water and oil can be easily mix with each other at the mixing point. After they are mixed with each other at the mixing point, a plurality of electrostatic induction fields caused by low frequency and low voltage and current signals act upon the mixing supply pipe so that the affinity between water molecules and oil molecules is more weakened and these molecules are varied so that the water and oil can be more intimately mixed with each other and the dissolved oxygen is increased. Further, the water and oil are subjected to emulsification in the heater-equipped emulsion tank 7 to thereby produce the hydrous oil and the hydrous oil is subjected to the aeration in the aeration tank 8 where additional oxygen is added to the hydrous oil and the hydrous oil is homogenized. Since the electrostatic induction fields act upon the mixing supply pipe between the emulsion tank 7 and the aeration tank 8, the desired hydrous oil can be obtained desirably. The resultant hydrous oil can be used for combustion in an engine or a combustion portion of a boiler, thereby remarkably reducing the consumption of fuel and NOx and CO contained in the exhausted fuel, which is advantageous in view of antipollution measures. Still furthermore, the device is safe and is manufactured at a low cost due to the use of the low voltage signal.

What is claimed is:

1. A method of manufacturing hydrous oil comprising the steps of supplying water from a water tank to a water pipe and oil from an oil tank to an oil supply pipe, mixing the oil with the water, subjecting the water and oil to emulsification to produce a hydrous oil and storing the hydrous oil in a storage tank, said method further comprising the steps of:

applying through an application unit a low frequency and low voltage and current signal to the water supply pipe, thereby weakening the affinity between water molecules and increasing the amount of dissolved oxygen in the water;

applying through an application unit a low frequency and low voltage and current signal to the oil supply pipe, thereby weakening the affinity between oil molecules and increasing the amount of dissolved oxygen in the oil;

mixing the water and oil, which respectively have a weakened affinity between their molecules and an increase in their dissolved oxygen content, in a mixing pipe;

applying through an application a low frequency and low voltage and current signal to the mixing pipe, thereby mixing the water and oil more intimately and increasing the dissolved oxygen content in the mixture;

subjecting the mixture of the water and oil to emulsification in a heater-equipped emulsion tank and facilitating the emulsification with the addition of air to produce the hydrous oil;

flowing the hydrous oil from the emulsion tank to an aeration tank and applying through an application unit a low frequency and low voltage and current signal to the hydrous oil flowing from the emulsion tank to increase the dissolved oxygen content therein and then supplying air to the hydrous oil in the aeration tank to produce aerated hydrous oil;

flowing the aerated hydrous oil from the aeration tank to a storage tank and applying through an application unit a low frequency and low voltage and current signal to the aerated hydrous oil flowing from the aeration tank so that the air is uniformly dispersed therein and the hydrous oil is freed from impurities; and storing the aerated hydrous oil in the storage tank, wherein said low frequency is from 40–320 Hz, said low voltage is from 0.5–2V and said current is from 1–3 mA.

2. A method according to claim 1, wherein the ratio of the amount of oil supplied from the oil tank to the amount of water supplied from the water tank ranges from 5:5 to 8:2.

3. A method according to claim 1, wherein the low frequency and low voltage and current signals have frequencies which are set such that the frequency applied to the oil supply pipe is higher than that applied to the water supply pipe, the frequency applied to the mixing pipe after the water and oil mix is set to be substantially the same as that applied to the oil supply pipe, and the frequency applied to the hydrous oil as it flows from the emulsion tank is substantially the same as that applied to the oil pipe, the voltage is set to be the same until the hydrous oil flows to the aeration tank and increases after the hydrous oil flows from the aeration tank while the current applied to the water supply pipe is higher than that applied to the oil supply pipe and the current applied to the mixing pipe is set to be between that applied to the water supply pipe and the oil supply pipe, and the current applied to the hydrous oil flowing from the emulsion tank is substantially the same as that applied to the mixing pipe.

* * * * *